United States Patent [19]

Reist

[11] Patent Number: 4,856,644
[45] Date of Patent: Aug. 15, 1989

[54] FLEXIBLE DRIVE TRANSMISSION

[75] Inventor: Walter Reist, Hinwil, Switzerland

[73] Assignee: SFT AG Spontanfördertechnik, Weinfelden, Switzerland

[21] Appl. No.: 638,712

[22] Filed: Aug. 8, 1984

[30] Foreign Application Priority Data

Aug. 22, 1983 [CH] Switzerland ............. 4562/83
Jul. 16, 1984 [CH] Switzerland ............. 3442/84

[51] Int. Cl.$^4$ .................................... B65G 19/14
[52] U.S. Cl. .................................... 198/716
[58] Field of Search ............ 198/716, 853; 474/86; 74/665 GE

[56] References Cited

U.S. PATENT DOCUMENTS

| | | | |
|---|---|---|---|
| 2,357,651 | 9/1944 | Hapman | 198/716 |
| 2,607,468 | 8/1952 | Hall | 198/716 |
| 2,940,424 | 6/1960 | Rose et al. | 198/716 |
| 2,966,746 | 1/1961 | Mellbin | 74/665 GE |
| 3,035,400 | 5/1962 | Stahlecker | 474/86 |
| 3,650,375 | 3/1972 | Fleischauer et al. | 474/86 |
| 3,718,051 | 2/1973 | Eck | 74/216.3 |
| 3,757,514 | 9/1973 | Reist | 59/78 |
| 3,788,454 | 1/1974 | Emerson | 198/716 |
| 3,993,184 | 11/1976 | Campbell | 198/716 |
| 4,397,145 | 8/1983 | Reist | 198/853 |

FOREIGN PATENT DOCUMENTS

| | | | |
|---|---|---|---|
| 0077467 | 9/1982 | European Pat. Off. . | |
| 2727038 | 1/1978 | Fed. Rep. of Germany | 198/716 |
| 401629 | 1/1943 | Italy | 198/716 |
| 53-98688 | 8/1978 | Japan | 198/716 |
| 538065 | 7/1973 | Switzerland . | |
| 621183 | 1/1981 | Switzerland . | |
| 243770 | 12/1925 | United Kingdom | 198/716 |
| 1583805 | 2/1981 | United Kingdom . | |

Primary Examiner—Joseph E. Valenza
Assistant Examiner—Daniel R. Alexander
Attorney, Agent, or Firm—Walter C. Farley

[57] ABSTRACT

The apparatus for transmitting a rotary movement with at least one drive and at least one power take-off and closed, flexible chain guides arranged between the same uses force transmission takes place by an endless chain, which can be subject to push and pull and which substantially corresponds to the total length of the chain casing in the inoperative state, i.e. the length of the chain channels in the guide casings of the drive and the power take-offs and the flexible chain guides between the same. The flexible chain guide comprises a hose bendable in all spatial directions, whose inner space is used as a chain channel. According to another embodiment, the flexible chain guide part running from the drive to the power take-off and the flexible chain guide part running from the power take-off to the drive are formed by a twin hose bendable in all spatial directions, whose two inner spaces are used as chain channels.

5 Claims, 3 Drawing Sheets

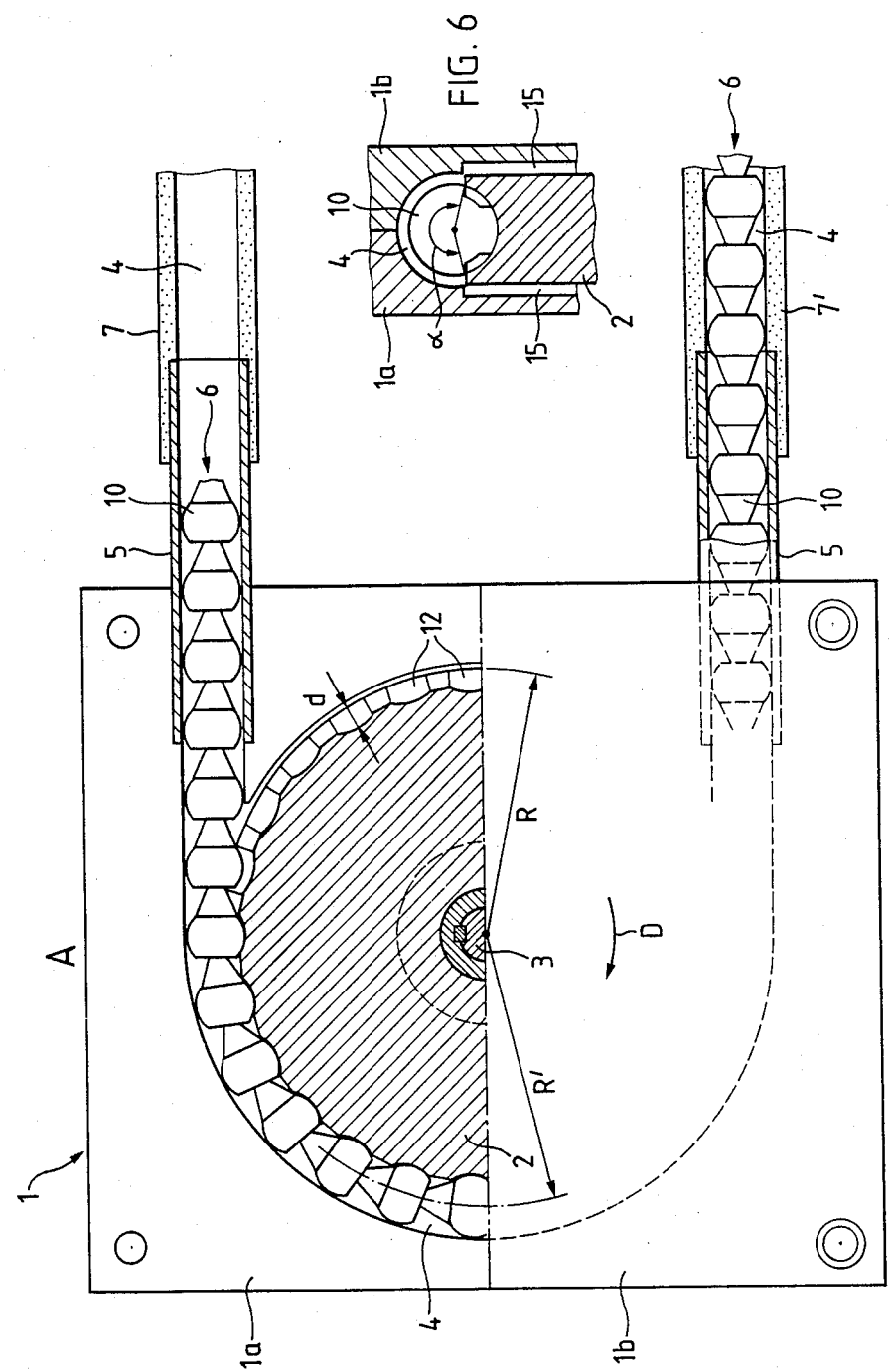

FLEXIBLE DRIVE TRANSMISSION

FLEXIBLE DRIVE TRANSMISSION

The invention is in the field of drive technology and relates to an apparatus for transmitting a rotary movement with at least one drive and at least one power take-off and flexible chain guides arranged between the same.

BACKGROUND OF THE INVENTION

Rotary drives are known, in which the transmission means, e.g. a rigid shaft, a chord or the like twists, or e.g. in the case of belts, chains, bands and the like is stretched by tensile forces. Each of these drive types has its own intrinsic advantages and disadvantages with respect to the drive transmission and these are also known. The rigid shaft is mainly suitable for force transmission over longer distances and it must be borne in mind that in the case of considerable loading, there can be a disturbing twisting effect. Chords in the sense of flexible shafts or chains are used for transmission over shorter distances. When using e.g. chain, a "rigid" transmission is expected and when using chords a flexible transmission, the latter only being suitable for the transmission of small torques due to the high torsion angle on loading.

For example, U.S. Pat. No. 3,718,051 discloses a force transmission system, which transmits rotary movement between a drive and a power take-off by means of flexible chain guides. The transmission means is constituted by a plurality of unconnected balls, which are pushed through the chain channels. In order to obtain a relatively uniform force or power transmission, the chain guide in the pushing drum must be very rigid, because if it had, flexible walls, the balls, the rounded surfaces of which are in contact with one another are positionally unstable in the pushing operation and must be positioned and stabilized by the channel walls. However, in the pulling drum, in which during the "return" of the balls substantially no forces act and certainly no forces resulting from force transmission to the balls, the elasticity or rather the stability of the chain guide is of minor significance. Thus, very narrow limits are applied to the flexibility of the described force transmission by means of balls. A uniform force transmission is not readily possible in the flexible construction.

BRIEF SUMMARY OF THE INVENTION

The object of the invention is to provide an apparatus permitting rotary force transmission by means of flexible connections between the drive and the power take-off in substantially jerk-free and axially synchronous operation by means of a random number of revolutions or over a random sum of angular degrees of both signs, in the case of alternating loading and alternating rotation direction.

This object is achieved by the invention as defined in the claims.

For discussions of structures related to the invention, reference is made to the Applicant's Swiss Pat. No. 621,183, which describes a chain drive with an endless roller chain. This chain drive is used as a conveying chain, preferably in conjunction with newspaper conveyors, the force action being taken from the chain by means of slots in the rigid chain channel. Certain advantages of this chain drive and in particular the jerk-free, smooth running of the chain in the rigid guidance channels are of assistance in achieving a qualitatively satisfactory realisation of the present invention.

BRIEF DESCRIPTION OF THE DRAWINGS

The invention is described in greater detail hereinafter relative to non-limitative embodiments and the attached drawings, wherein

FIG. 5 shows a detail of the embodiment according to FIG. 1.

FIG. 6 shows another detail of the embodiment according to FIG. 1.

DETAILED DESCRIPTION OF PREFERRED EMBODIMENTS

Figure 1:
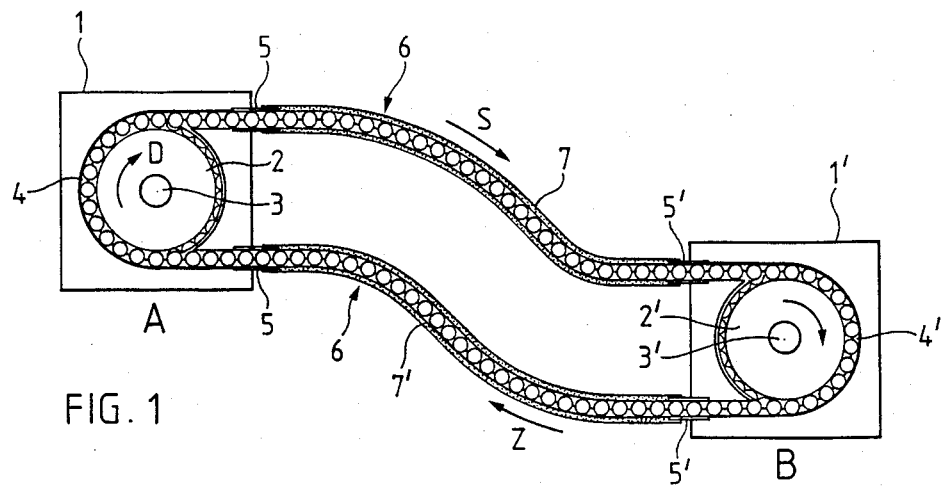
FIG. 1 is a simplified view of a first embodiment of the invention and consequently simultaneously the principle thereof.

The principle of the invention and at the same time a first embodiment thereof is shown in FIG. 1. Wherein A is a drive rotating in the clockwise direction and B is a power take-off rotating in the same direction. The drive and power take-off are operatively interconnected by means of an open-link chain, preferably a 3D-chain 6, as is fundamentally described in the Applicant's U.S. Pat. No. 3,757,514. Constructional details will be considered hereinafter in conjunction with other drawings and the first drawings are merely intended to illustrate the principle and use.

The drive and the power take-off are each housed in a guide casing 1, 1', in which are located the sprockets 2, 2' driving or driven by means of the force transmission shafts 3, 3', respectively. The guide casings 1, 1' are preferably constructed in symmetrical, two-shell manner, so that the drives and power take-offs can be selectively assembled in unit construction-like manner.

Chain 6 runs outside the guide casing 1, 1' through a flexible chain channel 7, which can e.g. compromise a hose or a flexible tube and can be bent together with the chain in any random spatial direction. As a function of the chain size, i.e. the diameter of the chain elements, it is possible to use radii or curvature within a wide range, so that apart from random spacings between the drive and the power take-off, it is possible to overcome virtually any intermediate topography. The flexible chain channel 7 is, for example, connected by means of a connecting piece 5 to the guide casing 1, 1'. However, the chain channel can also be fitted into the guide casing in some other way. For the purpose of guiding the open-link chain or 3D-chain 6 in the guide casing 1, 1' is incorporated a chain channel 4, 4' connected in shapewise manner with sprocket 2, 2' and in which the 3D-chain 6 can freely run.

If the length of the complete chain channel is made as close as possible to the nominal length of the endless chain, advantage can be directly taken of the resulting excellent running characteristics, as described in Swiss Pat. No. 621,183. It is obvious that the chain can be operated forwards and backwards in both directions. If the open-link chain is operated clockwise by drive A in the manner shown in this embodiment, the endless chain is loaded in chain guide 7 in the pushing direction S and in the other return chain guide 7' in the pulling direction Z. The reason for this advantageous and also desired behaviour will now be briefly described.

The total length of the chain channel or chain casing, i.e. the length of chain channels 4, 4' in guide casings 1, 1' of drive A and power take-off B and the chain guide 7, 7' between the same, is defined in the non-operational state. The total length of the chain running therein must essentially correspond to the total length of the chain channel in the non-operative state. In dynamic operation with a flexible chain guide, which necessarily must also have flexibility in the longitudinal direction, these geometrical conditions are influenced in varying manner. There is a relatively limited longitudinal extension in the pushing part of the circuit and a roughly identical limited compression in the pulling part of the circuit in the running direction, corresponding to the elasticity behaviour of the flexible chain guides, the relative chain speed, the friction behaviour between chain and guide and the torque to be transmitted. Thus, in operation, the chain guides have varying lengths in the pushing path portion and the pulling path portion. However, the nominal length of the chain remains the same overall and the total length of the chain channel remains substantially the same as the chain length or the length of the non-operative state but, as stated, the proportions between the flexible chain guides transmitting the push and pull forces differ as a function of the operating case.

If the nominal length of the chain is made longer than the total length of the chain casing in the non-operative state, then the chain guide of the pulling portion also starts to expand, because through the pushing of the chain into the flexible chain guide of the pulling portion, part of the pulling action is lost. The opposite takes place with a nominal length of the chain, which is less than the total length of the chain casing. The simultaneous utilization of the pushing and pulling forces during transmission can only take place in the tension-free state within relatively small divergences of the chain length from the chain casing length. The optimum situation is that of identical lengths and in practice substantially identical lengths can be obtained.

The force or power of the transmission from the drive to the power take-off is therefore also substantially halved into pulling and pushing force. A non-force-transmitting zone, such as occurs e.g. with a flexible drive using loosely connected or unconnected balls in the drive path, does not occur with the force transmission according to the invention.

In the case of the rigid chain guide of the open-link chain, as described e.g. in Swiss Pat. No. 621,183, the subdivision of the forces into simultaneously acting pushing and pulling forces does not occur, because the rigid chain guide, unlike the flexible chain guide, in the case of alternating loading and particularly alternating operation, cannot adapt to the peristaltic characteristics of the chain. The resulting characteristics of the chain and chain guide, as result from the teaching according to the invention, lead to a very high synchronism at any random angular position of the drive and power take-off during force transmission under alternating load or in the case of torque changes in a relatively wide range and in alternating operation.

In the drive according to the invention, it is also possible to frequently replace several expensive mitre gears and universal shafts. Apart from the reduced costs, the costs for servicing such gears and shafts are also avoided.

Figure 2A:
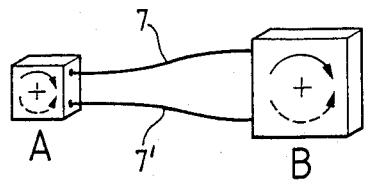
FIGS. 2a to 2c show modifications of the invention, as shown in FIG. 1.
Figure 2B:
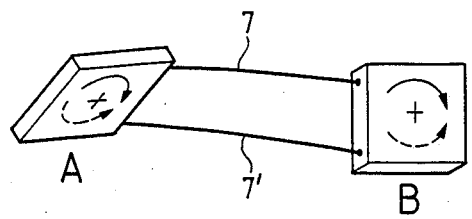
Figure 2C:
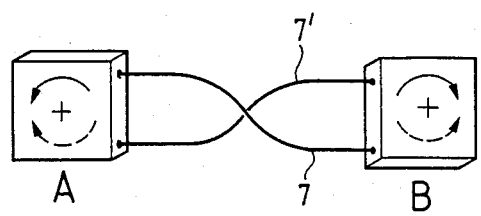

FIGS. 2a to 2c shown in simple symbolic form modifications to the invention and how the possible uses of the invention can be varied by making simple modifications. The force transmission of drive A in FIG. 2a is geared down by a larger sprocket diameter or a large number of teeth on power take-off B, whilst in the reverse case gearing up of the drive is possible. One of the possibilities of flexible drive transmission by means of flexible chain channels is shown in FIG. 2b, in which the drive and power take-off are pivoted with respect to one another. Thus, the drive can be installed in virtually all the layers so that difficultly accessible drives can be constructed. Gearing up or gearing down are both possible here. On pivoting by 180° in the manner shown in FIG. 2c, a torque reversal can be realised. As in the basic construction according to FIG. 1, in all these modifications, force can be transmitted by both chain strands, one transmitting pulling forces and the other pushing forces, which leads to a force balancing effect.

Figure 3:
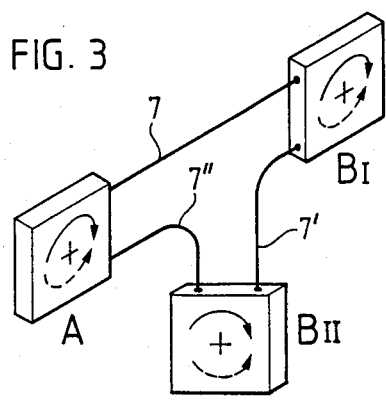
FIG. 3 shows a basic view of a randomly selectable multiple-axle drive formed from the components of the embodiment according to FIG. 1.
Figure 4:
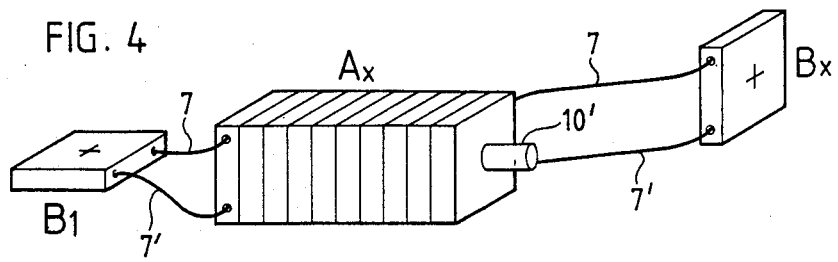
FIG. 4 shows a power branching by a drive with several power take-offs.

Whereas in the case of the modification according to FIG. 4, force is transmitted parallel from the drive block or power take-off power to the individual components, FIG. 3 shows the possibility of a serial force or power transmission to e.g. a drive I and a power take-off II, either in the same rotation direction and/or in opposite rotation directions, as a function of the reciprocal crossing of one or more power take-offs.

This makes it possible to solve very varied spatial drive problems. Another advantage of the invention is that the power take-off is movable during power transmission. This is particularly useful in the embodiment with twin hoses as flexible chain guides and which will be discussed hereinafter.

FIG. 4 shows a further modification of the invention, in which a multiple drive or power take-off is obtained by combining several drive components A, as is e.g. shown in FIG. 1. By means of a common central force transmission shaft 10, Ax drives are operated together, which e.g. drive the two power take-offs B1 and Bx shown in FIG. 4 by means of the chains running in the flexible chain channels 7, 7'. In the same way, the power take-offs can be randomly pivoted in spatial manner with respect to the drive block. A power take-off block with several components can just as variably be driven by means of a single drive.

FIG. 5 shows a detail of the embodiment according to FIG. 1, which can also be used for various aforementioned modifications, such as gearing up and down, drive or power take-off blocks, rotation direction reversal, etc. The following constructional details relate to the preferred use of a 3D-chain, as is described in principle by the Applicant's Swiss Pat. No. 538,065. What is shown is part of the flexible drive, as represented in FIG. 1, namely the drive-side part A. Casing 1 comprises two halves aa, 1b, in each case with incorporated sprocket casing halves and part of the chain channel 4 which can be particularly clearly seen in FIG. 6. Sprocket 2 is peripherally provided with depressions 12 for the partial reception of chain elements 10, which engage with sprocket 2 with depth d. Depth d is selected in such a way that the outside diameter R of sprocket 2 does not reach the radius of curvature R' of chain 6, i.e. $R' - R \approx 0$ always applies and is shown in FIG. 6 by the angle alpha $\approx 180°$. The effect of this measure is described in detail in the Applicant's Swiss Pat. No. application 6620/81-6.

FIG. 6 shows a further detail of the construction of a drive according to the invention. In order to achieve vibration free running and a sufficiently long operating life, a low-friction or preferably a friction-free operation is sought. As can be gathered from FIG. 5, a connecting piece 5 is arranged between casing 1 and flexible chain guide 7, the latter being e.g. a high pressure hose, with respect to the chain channel 4 in casing 1, that sprocket 2 can centre itself in the guide casing 1, accompanied by the formation of gaps 15 (FIG. 6). The unavoidable friction of the 3D-chain in chain channel 4 is minimized by a lubricant in the closed system.

Figure 7:
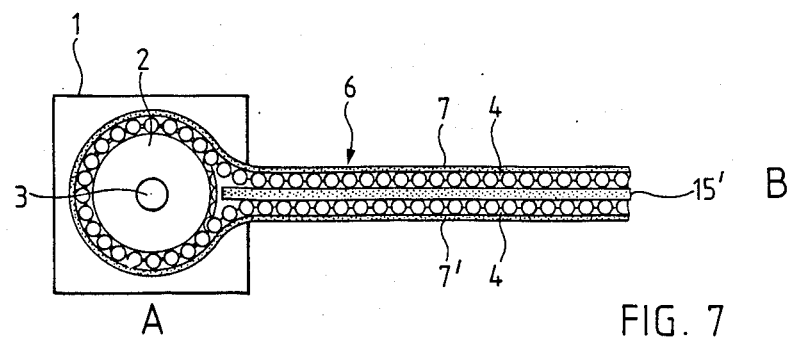
FIG. 7 shows another embodiment of the invention.

FIG. 7 finally shows an embodiment of the invention, in which the flexible chain guidance parts 7, 7' run in a twin hose with a partition 15 between or from and to the drive and power take-off in each case. Endless chain 6 runs in the inner areas of the twin hose provided for the chain channels. When using thin chains, this variant is equivalent to a shaft drive and can be operated as such, without said drive having the often undesired torsional characteristics of a shaft drive. This permits equally large spacings between the drive and power take-off. The freedom to pass the drive anywhere round the ambient space is very advantageous. Large torques can be removed with respect to the power take-off immediately following the starting up of the drive, the transmission behaving in movement-rigid manner and consequently synchronously.

The invention therefore relates to an apparatus for transmitting a rotary movement with at least one drive and at least one power take-off with flexible chain guides arranged between the same and which is characterized in that the force transmission takes place by means of an endless chain 6, operable in push and pull manner and corresponding substantially to the complete length of the chain casing in the inoperative state, i.e. the length of the chain channels (4, 4') in guide casings (1, 1') of the drive (A) and power take-off (B) and the flexible chain guides (7, 7') between the same. A serial interconnection of a plurality of power take-offs (BI, BII . . . BXX) drivable by a drive (A) by means of flexible chain guides (7', 7'', etc) constitutes a first embodiment of the invention and a parallel connection of drives (Ax) driven by a common shaft (10'), with power take-offs (Bl . . . Bx) connected to each drive (Al . . . Ax) by means of endless chains and flexible chain guides (7, 7') constitutes a second embodiment of the invention. Further embodiments are that the flexible chain guides (7, 7') comprise a hose bendable in all spatial directions, whose inner space is used as the chain channel (4); that the flexible chain guide part (7) running from drive (A) to power take-off (B) and the flexible chain guide parts (7') running from power take-off (B) to drive (A) comprises a twin hose bendable in all spatial directions, whose two inner spaces are used as the chain channel (4). Other obvious embodiments which can be derived from the invention more particularly relate to the construction of the preferably two-shell drives and/or power take-offs (A, B, C) and the flexible chain guide parts (7, 7').

I claim:

1. A chain drive apparatus for transmitting rotary movement comprising the combination of
   a drive unit having a chain channel therein and means for exerting longitudinal force on a chain extending through said channel;
   a power take-off unit having a chain channel therein and means for being acted on by force exerted by a chain extending through said channel;
   a plurality of flexible, elastic chain guide tubes interconnecting said chain channels to form an endless chain path; and
   an endless chain of elements interconnected in said chain path such that force exerted on said chain is transmitted along portions of said chain by pushing forces and concurrently along other portions of said chain by pulling forces, said chain having a length substantially equal to the length of said chain path in an inoperative state,
   said guide tubes being sufficiently elastic to extend and contract in response to the imposition on said portions of said chain of pushing and pulling forces, respectively, while the total length of said path remains substantially constant, whereby sudden alternations in the direction of force exerted by said drive unit are at least partially absorbed and smoothed before reaching said take-off unit.

2. An apparatus according to claim 1, wherein each flexible chain guide comprises a single elastic hose bendable in all spatial directions and whose inner space is used as the chain channel.

3. An apparatus according to claim 1 wherein the flexible chain guide extending from the drive to the power take-off and the flexible chain guide extending from the power take-off to the drive comprises a twin hose bendable in all spatial directions and whose two inner spaces are used as chain channels.

4. An apparatus according to claim 1 and including a plurality of serially interconnected power take-offs interconnected with and driven from said drive through said flexible chain guides.

5. An apparatus according to claim 1 and including a plurality of drive units in parallel driven by a common shaft;
   a plurality of power take-offs;
   a plurality of said chain guides interconnecting each said power take-off with one of said drive units; and
   a plurality of endless chains interconnecting associated ones of said power take-offs and drive units for transmitting movement therebetween.

* * * * *